US011919625B2

(12) United States Patent
Thompson (10) Patent No.: US 11,919,625 B2
(45) Date of Patent: Mar. 5, 2024

(54) AIRCRAFT LANDING GEAR ASSEMBLY

(71) Applicant: AIRBUS OPERATIONS LIMITED, Bristol (GB)

(72) Inventor: Robert Ian Thompson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 477 days.

(21) Appl. No.: 17/177,950

(22) Filed: Feb. 17, 2021

(65) Prior Publication Data

US 2022/0185461 A1   Jun. 16, 2022

(30) Foreign Application Priority Data

Feb. 18, 2020  (GB) ..................................... 2002231
Dec. 21, 2020  (GB) ..................................... 2020246

(51) Int. Cl.
*B64C 25/34* (2006.01)
*B64C 25/10* (2006.01)
*B64C 25/12* (2006.01)
*B64C 25/36* (2006.01)
*B64C 25/50* (2006.01)
*B64C 25/62* (2006.01)

(52) U.S. Cl.
CPC ............. *B64C 25/34* (2013.01); *B64C 25/10* (2013.01); *B64C 25/12* (2013.01); *B64C 25/36* (2013.01); *B64C 25/50* (2013.01); *B64C 25/62* (2013.01)

(58) Field of Classification Search
CPC ......... B64C 25/12; B64C 25/34; B64C 25/36; B64C 25/62
See application file for complete search history.

(56) References Cited

U.S. PATENT DOCUMENTS 9,073,629 B2 *   7/2015   Ducos ..................... B64C 25/10

FOREIGN PATENT DOCUMENTS

GB          2568742         5/2019

* cited by examiner

*Primary Examiner* — Nicholas McFall
(74) *Attorney, Agent, or Firm* — Nixon & Vanderhye P.C.

(57) ABSTRACT

An aircraft landing gear assembly is disclosed including a landing gear bracket, a fore lever receiving a fore aircraft wheel, an aft lever receiving a rear aircraft wheel, the fore and aft levers being independently moveable, wherein the bracket further comprises a fore lever stop to prevent downwards movement of the fore lever past a lowest rotational position with respect to the bracket at a first angle $\alpha_1$ forward from the notional bracket axis, and a rear lever stop to prevent downwards movement of the rear lever past a lowest rotational position at a second angle $\alpha_2$ behind from the notional bracket axis, wherein the first angle is greater than the second angle. An aircraft and a method of landing an aircraft are also disclosed.

15 Claims, 7 Drawing Sheets

AIRCRAFT LANDING GEAR ASSEMBLY

CROSS REFERENCE TO RELATED APPLICATIONS

This application claims priority to United Kingdom Patent Application GB 2002231.5, filed Feb. 18, 2020, and United Kingdom Patent Application GB 2020246.1, filed Dec. 21, 2020, the entire contents of each of which are hereby incorporated by reference.

BACKGROUND OF THE INVENTION

The present disclosure relates to an aircraft landing gear assembly.

The present invention concerns aircraft landing gear assemblies. More particularly, but not exclusively, this invention concerns an aircraft landing gear assembly, wherein the aircraft landing gear assembly comprises: i) a landing gear bracket comprising: a hinge portion for rotationally mounting the bracket relative to a landing gear bay, the hinge portion defining an axis of rotational mounting of the bracket, a first mounting point, the shortest distance from the axis of rotational mounting to the first mounting point defining a notional bracket axis, ii) a fore lever having a first end which is rotatably mounted to the bracket at the first mounting point and a second end for receiving a fore aircraft wheel, iii) an aft lever having a first end which is rotatably mounted to the bracket at the first mounting point and a second end for receiving a rear aircraft wheel, the fore and aft levers being independently moveable, iv) a fore linkage assembly, comprising at least one of a spring and a shock absorber, for transmitting ground loads from the fore lever to the bracket at a second mounting point, fore of the first mounting point, v) a rear linkage assembly, comprising at least one of a spring and a shock absorber, for transmitting ground loads from the rear lever to the bracket at a third mounting point, aft of the first mounting point, wherein the bracket further comprises: a) a fore lever stop to prevent downwards movement of the fore lever past a lowest rotational position with respect to the bracket, wherein the lowest rotational position of the fore lever is at a first angle forward from the notional bracket axis, b) a rear lever stop to prevent downwards movement of the rear lever past a lowest rotational position with respect to the bracket, wherein the lowest rotational position of the rear lever is at a second angle behind from the notional bracket axis, wherein the first angle is greater than the second angle. The invention also concerns an aircraft and a method of landing an aircraft.

Known twin-beam main landing gear (MLG) configurations, generally are arranged such that they have one or more fore wheels, and one or more aft wheels. In order to produce a soft and smooth landing, aircraft typically touchdown in a tail-down attitude, to spread the load over the aft wheels and then also over the fore wheels.

However, in some cases, landing with a tail-down attitude is not possible and/or not desirable, and a level landing (i.e. where the aircraft fuselage is substantially parallel to the ground/runway) must be performed. Level landings with twin beam main landing gear are uncomfortable, due to the increased load exerted on the aircraft due to the fore and aft wheels touching down at the same time. They also cause additional load to be transferred to the airframe, requiring the airframe to be designed to a higher load. In addition, these level landings are often at a higher descent rate than tail-down landings and so the landing can especially cause discomfort and higher forces in the airframe.

The present invention seeks to mitigate the above-mentioned problems. Alternatively or additionally, the present invention seeks to provide an improved landing gear assembly, aircraft and a method of landing an aircraft.

SUMMARY OF THE INVENTION

The present invention provides, according to a first aspect, an aircraft landing gear assembly, wherein the aircraft landing gear assembly comprises: i) a landing gear bracket comprising: a hinge portion for rotationally mounting the bracket relative to a landing gear bay, the hinge portion defining an axis of rotational mounting of the bracket, a first mounting point, the shortest distance from the axis of rotational mounting to the first mounting point defining a notional bracket axis, ii) a fore lever having a first end which is rotatably mounted to the bracket at the first mounting point and a second end for receiving a fore aircraft wheel, iii) an aft lever having a first end which is rotatably mounted to the bracket at the first mounting point and a second end for receiving a rear aircraft wheel, the fore and aft levers being independently moveable, iv) a fore linkage assembly, comprising at least one of a spring and a shock absorber, for transmitting ground loads from the fore lever to the bracket at a second mounting point, fore of the first mounting point, v) a rear linkage assembly, comprising at least one of a spring and a shock absorber, for transmitting ground loads from the rear lever to the bracket at a third mounting point, aft of the first mounting point, wherein the bracket further comprises: a) a fore lever stop to prevent downwards movement of the fore lever past a lowest rotational position with respect to the bracket, wherein the lowest rotational position of the fore lever is at a first angle forward from the notional bracket axis, b) a rear lever stop to prevent downwards movement of the rear lever past a lowest rotational position with respect to the bracket, wherein the lowest rotational position of the rear lever is at a second angle behind from the notional bracket axis, wherein the first angle is greater than the second angle.

This enables the fore and aft landing gear levers to be arranged such that the rear lever is angled further downwards than the fore lever. Hence, fore tyres are set slightly higher and the rear tyres set slightly lower than level. I.e. the rear tyres are closer to the ground. This means that, in use, even if an aircraft is approaching landing in a flat configuration (i.e. the rotational mounting axis, which is substantially parallel to a longitudinal axis of the aircraft, being substantially horizontal), the rear wheel would touch down on the runway ground prior to the fore wheel. This means that the landing gear, through the linkage assemblies, can provide a smoother, softer touchdown for crew and passengers, even in such a flat configuration. This is because only the rear wheel can touchdown at a certain time; the fore wheel touches down later (i.e. after the rear wheel has touched the ground). This reduces the dynamic loads experienced by the airframe, which enables the airframe to be lighter. This is especially important as flat landings are often performed at higher descent rates than tail down landings (and so have the potential to be more uncomfortable and to cause greater dynamic airframe loading). The aft wheel touching down first causes the aft wheel to "spin-up" before the fore wheel, as the "spin-up" of the wheels is caused by the impulse of the tyre contacting the ground. On a conventional landing gear, the vibrations associated with the "spin-up" of the fore and aft wheels are felt at the same time, which can cause additional forces due to resonance effects. These additional forces coincide with the vertical load exerted on the airframe as the aircraft touches down. Thus, airframes are made structurally stronger to withstand these vibrations. Having the vibrations associated with the "spin-up" of the aft wheel and the fore wheel occur at different times can reduce any resonance effects that result from the vibrations from the "spin-up" of the wheels, and thus reduces the force exerted on the airframe. Thus, the rear wheel touching down before the fore wheel, allows for structural savings in the weight of the airframe.

Furthermore, such an arrangement allows for a "weight on wheels" situation to be detected more easily. This enables braking, lift dumping and reverse thrust to be initiated earlier. The "weight on wheels" situation can be more easily detected because the rear (and fore) levers are moving off from a fixed stop when they touch the ground. They do not have to move off from a relative position of a hydraulic cylinder and there is no ability to move off in a different direction. For example, traditionally, "weight on wheels" has been detected if a landing gear bogie has pitched away from its in-flight condition. However, if the bogie is nominally almost flat in flight, it is possible to get spurious or flickering indications of "weight on wheels" during taxiing as the bogie slightly pitches up & down from ground undulations.

The bracket is designed to attach the landing gear to the aircraft so that it can rotate about the rotational mounting axis between retracted (in the landing gear bay) and extended positions. In use, the notional bracket axis may be substantially vertical when the landing gear is extended. In use, the notional bracket axis may be at substantially ninety degrees to the rotational mounting axis. In use, the rotational mounting axis may be substantially horizontal.

The fore and aft levers may be independently moveable from each other. This allows both the fore aircraft wheel and the rear aircraft wheel to react independently to forces experienced in landing.

The first angle is the angle between the notional bracket axis extending past the first mounting point from the hinge portion and the fore lever in its lowest rotational position, measured at the first mounting point. The second angle is the angle between the notional bracket axis extending past the first mounting point from the hinge portion and the rear lever in its lowest rotational position, measured at the first mounting point. The smallest possible angle between the fore lever and the aft lever (at the first mounting point) is the sum of the first angle and the second angle.

There may be more than one fore wheel mounted on the fore lever, for example mounted on a fore axle carried by the fore lever. There may be more than one aft wheel mounted on the aft lever, for example mounted on a rear axle carried by the aft lever.

In the case where there is more than one fore or aft wheel, the landing gear arrangement will ensure that any and all rear wheels of the landing gear arrangement that contact during landing have contacted prior to any of the fore wheels.

Preferably, the fore lever stop is provided by a surface, having a surface angle, the surface angle corresponding to the first angle. This provides effective stopping of the lever, compared to a single point stop, for example.

The surface of the lever stop may correspond to the corresponding surface of the fore lever. This results in a relatively large area of the contact between the surface of the lever stop and the lever. This provides more effective stopping of the lever, compared to a single point stop, for example.

Preferably, the fore lever stop surface is fixed in relation to the bracket. For example, it may be integrally formed with the bracket. This means that the stop is not affected by movement of parts of the landing gear and provides a reliable stop for the lever, not dependent on any relative positioning of the stop. For example, the stop is not formed as part of a hydraulic cylinder, or pitch trimmer control, which is pivotally connected to the bracket. In other words, the stop is an entirely passive device that requires no moving parts. Such a stop is easier to maintain, and offers improved reliability compared to active stops, such as hydraulic cylinders or the like.

The fore lever stop may be a block of metal fixedly attached to the bracket. For example, it may be integrally formed with the bracket.

Preferably, the rear lever stop is provided by a surface, having a surface angle, the surface angle corresponding to the second angle. This provides effective stopping of the lever, compared to a single point stop, for example, the surface could correspond to the corresponding surface of the aft lever. This results in a relatively large area of the contact between the surface of the lever stop and the lever. This provides more effective stopping of the lever, compared to a single point stop, for example Preferably, the rear lever stop surface is fixed in relation to the bracket. For example, it may be integrally formed with the bracket. This means that the stop is not affected by movement of parts of the landing gear and provides a reliable stop for the lever, not dependent on any relative positioning of the stop. For example, the stop is not formed as part of a hydraulic cylinder, or pitch trimmer control, which is pivotally connected to the bracket. In other words, the stop is an entirely passive device that requires no moving parts. Such a stop is easier to maintain, and offers improved reliability compared to active stops, such as hydraulic cylinders or the like.

The aft lever stop may be a block of metal fixedly attached to the bracket. For example, it may be integrally formed with the bracket.

Preferably, the fore lever stop and the rear lever stop are both provided by a single lever stop assembly attached to the bracket. For example, it may be integrally formed with the bracket. Such a lever stop assembly is efficient to install and maintain. Providing a lever stop assembly like this results in a reliable way of ensuring the angle that is the sum of the first angle and second angle is consistent across different landing gear, i.e. that the assembly that provides both surfaces is attached (as a whole) to the bracket. Such a lever stop assembly also provides an advantage that the bracket is not required to link (i.e. the bracket does not form part of the lever stop assembly) of the two surfaces.

The lever stop assembly may be a single component. The lever stop assembly may be a block of metal fixedly attached to the bracket. For example, the lever stop assembly may be integrally formed with the bracket.

The single lever stop assembly may be substantially in the shape of a sector of a circle. In this case, the two angled surfaces corresponding to radii of the circle are a fore lever stop surface and a rear lever stop surface. Alternatively, the single lever stop assembly may be substantially triangular in shape.

Preferably, the fore linkage assembly and rear linkage assembly are independent of each other, such that movement of one linkage assembly does not affect the other linkage assembly. This provides redundancy in case failure of one of the linkage assemblies. For example, in such a configuration the fore and aft linkage assemblies are not connected by balance beam. For example, the linkage assembly, which is sized to accept load inputs from both the forward and aft axle beams, has a nominal spring rate, which is the spring rate that is required to balance the load inputs during landing and the aircraft mass. Thus, when the rear tyres touch down first, they may be arranged to react aircraft mass at approximately half the nominal spring rate. When the front wheels subsequently touch down, then the front wheels also reacts aircraft mass at approximately half the nominal spring rate, such that the aircraft mass is reacted at the nominal spring rate.

Preferably, the fore linkage assembly and rear linkage assembly are linked so that the load sharing between the fore and aft wheels is balanced. This allows load to be shared between the fore lever and the aft lever. This therefore allows loads to be shared between wheels substantially equally, e.g. if there are two fore wheels and one rear wheel, each wheel on the landing gear assembly will experience substantially the same load. This has the advantage of resulting in less wear on tyres, and makes the landing gear assembly easier to manage and maintain. An additional advantage is that such a load sharing mechanism will result in less damage to runways. For example, the fore linkage assembly and rear linkage assembly may be linked by a balance beam. The balance beam may allow the load to be shared between the wheels substantially equally.

Preferably, the first angle is between 110 and 200% greater than the second angle, preferably between 130 and 170% greater, even more preferably between 140 and 160% greater. For example, the first angle may be approximately 60 degrees, or for example between 50 and 70 degrees, and the second angle may be approximately 40 degrees, or for example between 30 and 50 degrees. Preferably, the first angle is greater than 45 degrees. Preferably, the second angle is less than 45 degrees.

Preferably, the landing gear assembly is a main landing gear assembly.

According to a second aspect of the invention there is also provided an aircraft including the aircraft landing gear assembly of the first aspect of the invention, wherein the bracket is rotationally mounted relative to a landing gear bay about the axis of rotational mounting.

The aircraft landing gear assembly may be a main landing gear. The aircraft landing gear assembly may have more than one fore wheel, and/or more than one aft wheel.

Preferably, the axis of rotational mounting is substantially parallel to a longitudinal axis of the aircraft.

According to a third aspect of the invention there is also provided a method of landing an aircraft, the aircraft being the aircraft of the second aspect of the invention.

According to a fourth aspect of the invention, there is also provides a method of landing an aircraft comprising the following steps: i) deploying a landing gear from a landing gear bay, by rotating a landing gear bracket about an axis of rotational mounting, ii) a fore lever, rotationally mounted to the bracket, carrying a fore landing gear wheel, dropping to rest against a fore stop, iii) an aft lever, rotationally mounted to the bracket independently of the fore lever, carrying an aft landing gear wheel, dropping to rest against an aft stop, so as to extend lower than the fore wheel when a longitudinal axis of the aircraft is substantially horizontal.

The dropping of the fore lever to rest against the fore stop and/or the dropping of the aft lever to rest against the aft stop may occur substantially under the force of gravity. The dropping of the fore lever to rest against the fore stop and/or the dropping of the aft lever to rest against the aft stop may be encouraged by a pre-loaded force. The pre-loaded force may be applied by a spring. The application of a pre-loaded force advantageously prevents the fore and/or aft levers from moving away from the fore/and or aft stops during airborne turbulence (for example, on approach to a runway), and thus presents any false detection of "weight on wheels", in the case where the detection of "weight on wheels" is determined by lack of contact of the fore/aft lever with the respective fore/aft stop.

The landing gear may be a main landing gear. The landing gear may have more than one fore wheel, and/or more than one aft wheel. The axis of rotational mounting may be substantially parallel to the longitudinal axis of the aircraft.

Preferably, the aft wheel contacts the ground before the fore wheels. Any and all rear wheels that contact during landing have contacted prior to any of the fore wheels.

Preferably, the fore stop surface is fixed in relation to the bracket. The fore stop may be a block of metal fixedly attached to the bracket.

Preferably, the aft stop surface is fixed in relation to the bracket. The aft stop may be a block of metal fixedly attached to the bracket.

Preferably, the fore stop and the aft stop are both provided by a single stop assembly attached to the bracket. The fore stop and aft stop may be a single component. The single component may be substantially in the shape of a sector of a circle.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
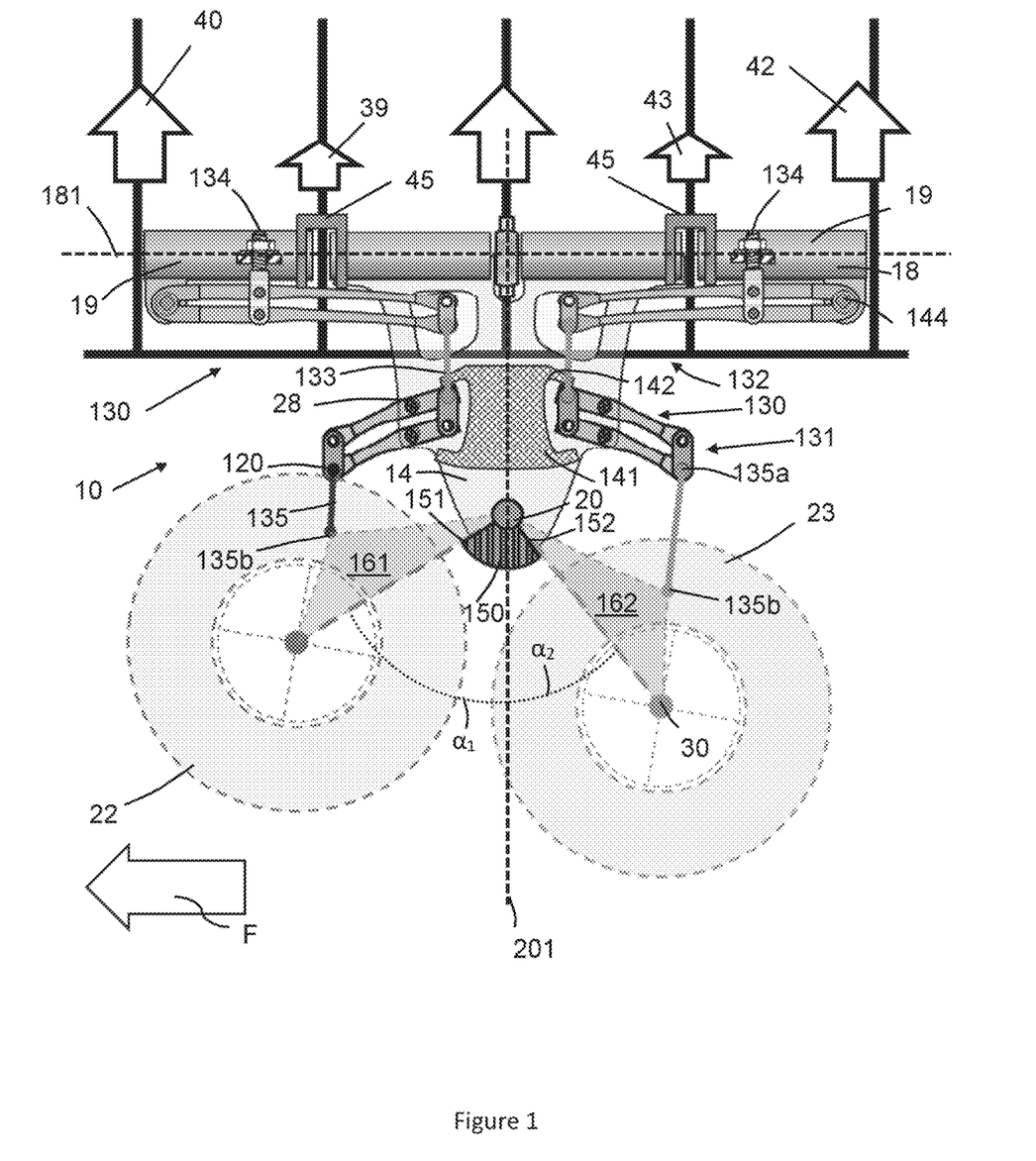
FIG. 1 is a sectional side view of part of an aircraft showing a modular aircraft landing gear assembly, according to a first embodiment of the invention.
Figure 7:
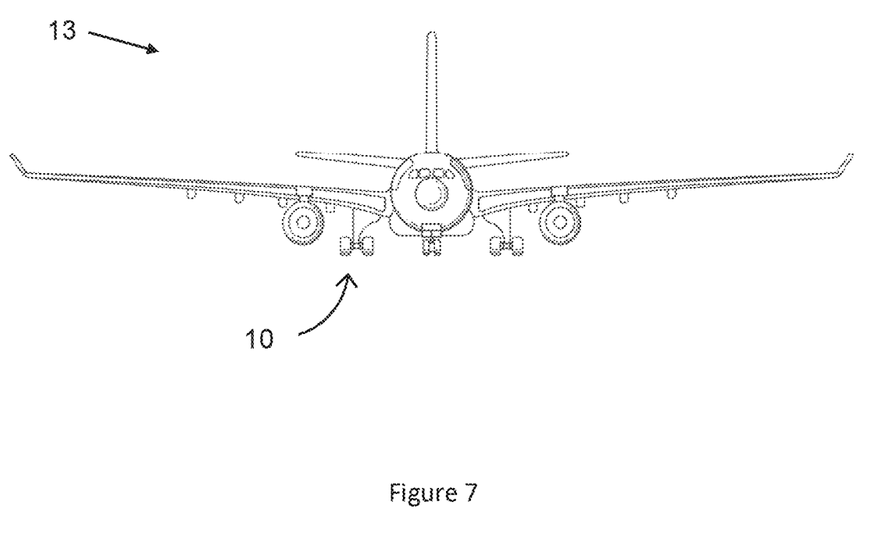
FIG. 7 shows an aircraft suitable for being provided with the landing gear assembly of any of the embodiments described.

FIG. 1 shows schematically an aircraft landing gear assembly 10 according to a first embodiment of the invention, suitable for use on an aircraft (such as that shown on FIG. 7). The fore direction is shown in FIG. 1 with the arrow labelled F. The aircraft landing gear assembly comprises a bracket and spring assembly arrangement for transmitting ground loads, which has various potential design advantages as compared to prior landing gear assemblies which transmit the majority of ground loads utilising a single elongate landing gear leg with an integrated shock absorber (referred to in the art often as an oleo landing gear design). The bracket acts as the main fitting for the aircraft landing gear assembly.

The landing gear assembly 10 of FIG. 1 includes a bracket 14 extending from a hinge portion 18 to a first mounting point 20 for mounting at least two wheels 22, 23 via one or more pivoting levers 16. The hinge portion 18 allows for mounting of the bracket 14 for rotation relative to a landing gear bay, so that the landing gear assembly 10 may move between a stowed position (in the landing gear bay) to a deployed position (for landing, taxiing and take-off), as shown in FIG. 1. In the deployed position, the first mounting point 20 receives ground loads from the wheels 22, 23 when the aircraft's weight is supported on the ground. There may also be a side-stay assembly (not shown) for reacting lateral loads on the landing gear which transmit loads into the aircraft at a further location. It will be noted that the perspective views in the Figures show different details from that shown in the side views. The hinge portion 18, passes loads from the bracket into the aircraft structure 12 via two outer mounting points (not shown). There are be other mounting points (not shown) both fore and aft of the hinge portion 18 for mounting of the bracket 14 to aircraft structure, in this case to the fuselage of the aircraft. In some embodiments, there are four mounting locations in total.

The bracket 14 comprises two parallel spaced-apart plates (only one plate visible from the view of FIG. 1), each having a (very generally) triangular shape (the base of the triangle corresponding to the hinge portion and the first mounting point 20 being at or close to apex of the triangle, opposite the base).

The longitudinal axis of the hinge portion 18 defines an axis of rotational mounting 181. The shortest distance between the first mounting point 20 and the axis of rotational mounting defines a notional bracket axis 201.

There are two levers, a fore lever 161, and an aft lever 162, each being rotatably mounted at one end to the bracket 14 at the first mounting point 20 and each respectively receiving an aircraft fore wheel 22 and an aft wheel 23 at the opposite end. Each lever 161, 162 is associated with a spring assembly 130, which may be considered as being, or forming part of, an independent modular suspension system for the wheel(s) carried by the lever with which the spring assembly 130 is associated. Both the fore wheel 22 and the aft wheel 23 are mounted for rotation about a respective axis 30. Each lever 161, 162 rigidly connects between three points: the first mounting point 20, the wheel axis 30, and an end 135b of a linkage 135 (the other end 135a of which pivotally connects to an end of a first spring element 131, which forms part of the spring assembly 130, as is explained in further detail below). In use, the load from either the fore wheel 22 or the aft wheel 23 is applied to a loading point 120 via either of the levers 161, 162 and their corresponding linkage 135.

The fore lever 161 and the aft lever 162 are independently movable with respect to each other. By this, what is meant is that the movement of the fore lever 161 does not influence the movement of the aft lever 162, when these parts are considered in isolation.

Bracket 14 is provided with a stop assembly 150. The stop assembly 150 is in the form of a metal block fixedly attached (with a bolt, not shown) to the bracket 14. It is in the shape of a sector of a circle, centred on the first mounting point 20.

Stop assembly 150 is located below the first mounting point 20 and is angled towards the fore direction F of the aircraft. In other words, when considering a fore-aft plane of symmetry running through first mounting point 20, a higher proportion of the stop assembly 150 will be on the fore side of the plane of symmetry.

The stop assembly 150 has a fore lever stop 151 provided by a front angled surface of the stop 150, starting at the first mounting point 20. This surface is flat to correspond to a substantially flat shape of the bottom of the fore lever 161. The surface of the fore lever stop 151 therefore provides a relatively large area of contact that can touch the fore lever 161. The fore lever stop 151 prevents downwards movement of the fore lever 161 past a lowest rotational position with respect to the bracket 14. The lowest rotational position of fore lever 161 with respect to the bracket 14, is at a position that is fore of the notional bracket axis 201. The lowest rotational position with respect to the bracket 14 is at a first angle $\alpha_1$ forward of the notional bracket axis 201, corresponding to the angle of the front surface. The first angle $\alpha_1$ forward of the notional bracket axis 201 is 60 degrees.

The stop assembly 150 has an aft lever stop 152 provided by a rear angled surface of the stop 150, starting at the first mounting point 20. This surface is flat to correspond to a substantially flat shape of the bottom of the aft lever 162. The surface of the aft lever stop 152 therefore provides a relatively large area of contact that can touch the aft lever 162. The aft lever stop 152 prevents downwards movement of the aft lever 162 past a lowest rotational position with respect to the bracket 14. The lowest rotational position of aft lever 162 with respect to the bracket 14, is at a position that is aft of the notional bracket axis 201. The lowest rotational position with respect to the bracket 14 is at a second angle $\alpha_2$ aft of the notional bracket axis 201. The second angle $\alpha_2$ aft of the notional bracket 201 axis is 40 degrees.

Both the surface of the fore lever stop 151 and the surface of the aft lever stop 152 correspond to the radii of the circle. This arrangement means that when both the fore lever 161 and the aft lever 162 are in their lowest rotational position, the rear lever 162 will be angled further downwards than the fore lever 161. Since the fore lever 161 and the aft lever 162 are the same length, this results in a tyre on the aft wheel 23 on the aft lever 162 being closer to the ground (not shown, but parallel to the axis of rotational mounting 181 for a flat landing) than a tyre on the fore wheel 22 on the fore lever 161.

In the present embodiment, there is only one fore wheel 22 present on the fore lever 161 and one aft wheel 23 present on the aft lever 162, however the skilled person will understand that each wheel axis 30 (both fore and aft) could support two or more wheels. In such a case, all of the aft wheels would touch the ground before all of the fore wheels.

As described above, the stop assembly 150 is substantially the shape of a sector of a circle. Alternatively, the stop assembly may be substantially triangular in shape. In other embodiments, the stop assembly may be any shape that provides a fore lever stop 151 and an aft lever stop 152 in suitable relative positions.

The spring assembly 130 is similar to that disclosed in the embodiments of GB 2 568 742, the contents of which being incorporated by reference thereto. However, a brief explanation of the spring assembly 130 and other subject matter covered by GB 2 568 742 is also included in the description, which now follows.

There is separate spring assembly 130 for both the fore lever 161 and the aft lever. The fore lever 161 and aft lever 162 can therefore move independently relative to each other, and thus can move independently relative to each other.

Each spring assembly 130 includes first spring elements 131 and second spring elements 132. The first spring elements 131 form part of a linkage assembly transferring loads from the fore/aft wheel 22, 23 via the fore/aft lever 161, 162 into the bracket 14. Therefore, there is a fore linkage assembly that transfers load from the fore wheel 22 into the bracket 14 via the fore lever 161, and an aft linkage assembly that transfers load from the aft wheel 23 via the aft lever 162 into the bracket 14. The first spring elements 131 are mounted on the bracket at a fourth mounting point 28 of the bracket, permitting pivoting movement of the first spring elements 131 relative to the bracket.

The second spring element 132 is associated with a preload applicator 134 (described below). The spring assembly 130 comprises a loading point 120 for receiving ground load from the wheel(s) in use. The loading point 120 in this embodiment is at the joint between the linkage 135 and the first spring element 131. The loading point 120 is thus movable relative to the hinge portion 18. The spring assembly 130 is configured to apply a resilient biasing force to the loading point 120 to oppose movement of the loading point 120 relative to the hinge portion 18. In this embodiment, the loading point 120 is movable towards and away from the hinge portion 18, and the spring system or spring assembly 130 is configured to apply a resilient biasing force to the loading point 120 to oppose movement of the loading point 120 towards the hinge portion 18. During application of an increasing load to the loading point 120 against the resilient biasing force of the spring assembly 130, a spring rate of the spring assembly 130 changes from a first spring rate to a second spring rate, the second spring rate being less than the first spring rate. The first spring rate can therefore be a relatively moderate spring rate for getting load onto the wheel(s), which can help lessen or avoid skidding and to help improve braking drag. The second, lower spring rate can thereafter help provide a soft ride characteristic. In this embodiment, the movement of the loading point 120 is towards the hinge portion 18 during application of the increasing load to the loading point 120, such as during a landing procedure or event. In this embodiment, the spring assembly 130 is also configured so that, if the load applied to the loading point 120 against the resilient biasing force further increases, the spring rate of the spring assembly 130 changes from the second spring rate to a third spring rate, the third spring rate being greater than the second spring rate. This third spring rate can help to react loads in high-descent-rate landings, and/or may help to improve lateral stability when the aircraft to which the landing gear is mounted is taxiing or otherwise turning on the ground. The third spring rate may be substantially equal to the first spring rate in certain embodiments, and may be less than (or greater than) the first spring rate in others.

The spring elements 131 and 132 each comprise a leaf spring. Use of leaf springs can enable the spring assembly 130 to begin to compress as soon as a load is applied to the loading point 120. That is, the spring assembly 130 may be considered to have a zero, or substantially zero, break-out load. This can facilitate weight-on-wheels detection, such as to determine whether the landing gear 10 (and the aircraft 12 to which it is mounted) has landed. A substantially zero break out load may mean that the spring assembly 130 can detect weight-on-wheels detection when an aircraft lands, but will not detect minor loads that may be experienced by loading point 120, such as those which are experienced during turbulence as the aircraft approaches for landing, for example.

In this embodiment, the first spring element 131 is coupled to the second spring element 132 via a link 133. A first end of the link 133 is pivotally coupled to the first spring element 131, and a second end of the link 133 is pivotally coupled to the second spring element 132. In other embodiments, the link 133 may be omitted. In some such embodiments, the first spring element 131 may be pivotally coupled directly to the second spring element 132. The spring elements themselves may be considered as links which form the overall linkage assembly.

The bracket 14 of this embodiment has a first spring stop 141 and a second spring stop 142, which together are configured to limit an angular range of rotation of the first spring element 131 about the mounting point 28. The first stop 141 limits rotation during the application of the increasing load to the loading point 120, whereas the second stop 142 limits rotation during removal or reduction of the load. One end of the second spring element 132 is rotationally mounted to the bracket 14 at a further mounting point 144.

The preload applicator 134 of the spring assembly 130 of this embodiment is provided for applying a preload to the second spring element 132 and thus apply a preload to the first spring element 131, to bias the first spring element 131 away from the first stop 141 of the bracket 14. Thus, when increasing load is applied to the loading point 120 from the wheel 22 rotational movement of the first spring element 131 is caused about the mounting point 28 in one rotational direction, whereas the preload biases the first spring element 131 to move in the opposite rotational direction.

In further embodiments, the spring assembly 130 comprises one first spring element 131 and plural second spring elements 132 (for example such that a combined spring rate of the plural second spring elements 132 is less than the spring rate of the first spring element 131). In still further embodiments, the spring assembly 130 may comprise plural first spring elements 131 and one second spring element 132 (for example, the spring rate of the second spring element 132 being less than the combined spring rate of the plural first spring elements 131).

The arrangement of the components of the landing gear of the first embodiment will now be described in use. The loads that are passed from the bracket and/or the hinge portion 18 into the aircraft are shown schematically by the vertical arrows 39, 40, 42, 43 at the top of FIG. 1. In use, the notional bracket axis 201 is substantially vertical when the landing gear is extended. In use, the notional bracket axis 201 is at substantially ninety degrees to the rotational mounting axis 181. In use, the rotational mounting axis 181 may be substantially horizontal.

In other embodiments, the bracket 14 may be shaped to extend as far as the loading points indicated by arrows 40 and 42. In this embodiment, there are two tubular attachments 19, one each at the forward and aft attachment points.

These tubular elements 19 are each connected in a rotational sense only (i.e. about the retraction axis) to the (smaller) bracket 14 by a rotatable coupling shown in FIG. 1 as an inverted "U" 45. The loads into the airframe structure are therefore via multiple (smaller) load paths, thus spreading the load more evenly into the aircraft fuselage. The loads transmitted from the mounting points 20 and 28 via the bracket 14 into the airframe (via the second and third mounting points 24, 26) are shown by the smaller "up" arrows 39, 43. The loads transmitted via the second spring elements 132 are transmitted via the fore and aft rotatable couplings 19 into the outer attachment points (as represented by the larger arrows 40, 42 in FIG. 1), and to some extent into the inner two load point (via points 24, 26).

Figure 2:
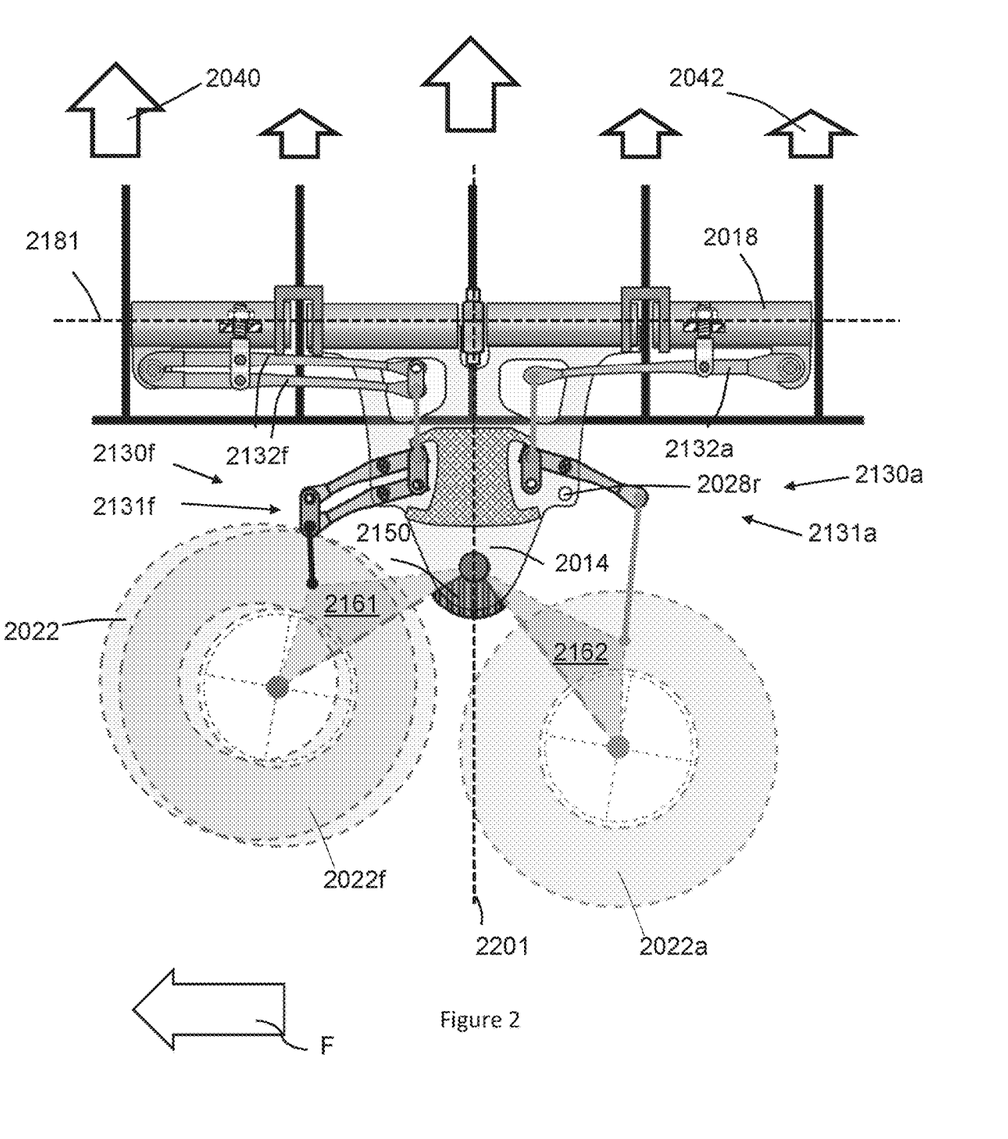
FIG. 2 is a sectional side view of part of an aircraft showing a modular aircraft landing gear assembly for a three-wheel configuration, according to a second embodiment of the invention.

FIG. 2 shows a landing gear assembly according to a second embodiment similar to that shown in FIG. 1. Like reference numerals are used for like parts, but adding 2000 to the numbers used in FIG. 1. The main differences between the two embodiments will now be described. The landing gear 2010 has two levers 2016 which between them carry three wheels 2022. In this embodiment, the fore wheel 2022*f* is mounted such that it is arranged centrally (in the spanwise direction) relative to the bracket. The centre plane of the wheel 2022*f*—such a plane having the wheel axis as its normal—is substantially coplanar with the corresponding centre plane of the bracket (or at least, the bracket 2014 and wheel 2022*f* are so arranged that the main load bearing structure of the bracket extends to either side of the centre plane of the wheel). The central mounting of the fore wheels 2022*f* and 2022 is readily achieved as a result of the spaced apart parallel plates that form the bracket 2014. The fore wheels 2022 in front of the aft wheel 2022*a* are in a diablo arrangement (axes lying on a common notional line), with one fore wheel 2022 being located to one side in an outboard direction of the bracket 2014 (and also in a position located to one side in an outboard direction of the lever 2016) and the other fore wheel 2022*f* being located to the other side (i.e. in an inboard direction) of the bracket 2014 (and also in a position located to one side in the inboard direction of the lever 2016).

A bigger spring assembly is associated with the two wheels than is provided for the single wheel (this need not be twice the size however). The aft spring assembly 3130*a* associated with the single aft wheel 2022*a* has a first spring element 2131*a* in the form of a single leaf spring and a second spring element 2132*a* also in the form of a single leaf spring. The fore spring assembly 2130*f* associated with the dual wheels 2022*f* has two first spring elements 2131*f* in the form of two leaf springs arranged in parallel and a second spring element 2132*f* also in the form of two leaf springs arranged in parallel.

It will be noted that the shape of the bracket 2014 is the same as the bracket 14 of FIG. 1. In these respective embodiments, the same shape, size, and material is used. A comparison of the relative loads expected to be transmitted into the aircraft illustrated schematically by the arrows at the top of FIG. 2. The load 2040 at the fore end of the hinge portion of the bracket 2014 of FIG. 2 is greater than the expected load 2042 at the far aft end; whereas when compared to the spread of loads shown in FIG. 1, the relative loads 40, 42 at the far fore end and the far aft end are similar in magnitude. The mass and shape of the hinge portion of the bracket as compared between FIGS. 1 and 2 is very similar (optimally substantially the same).

Figure 3:
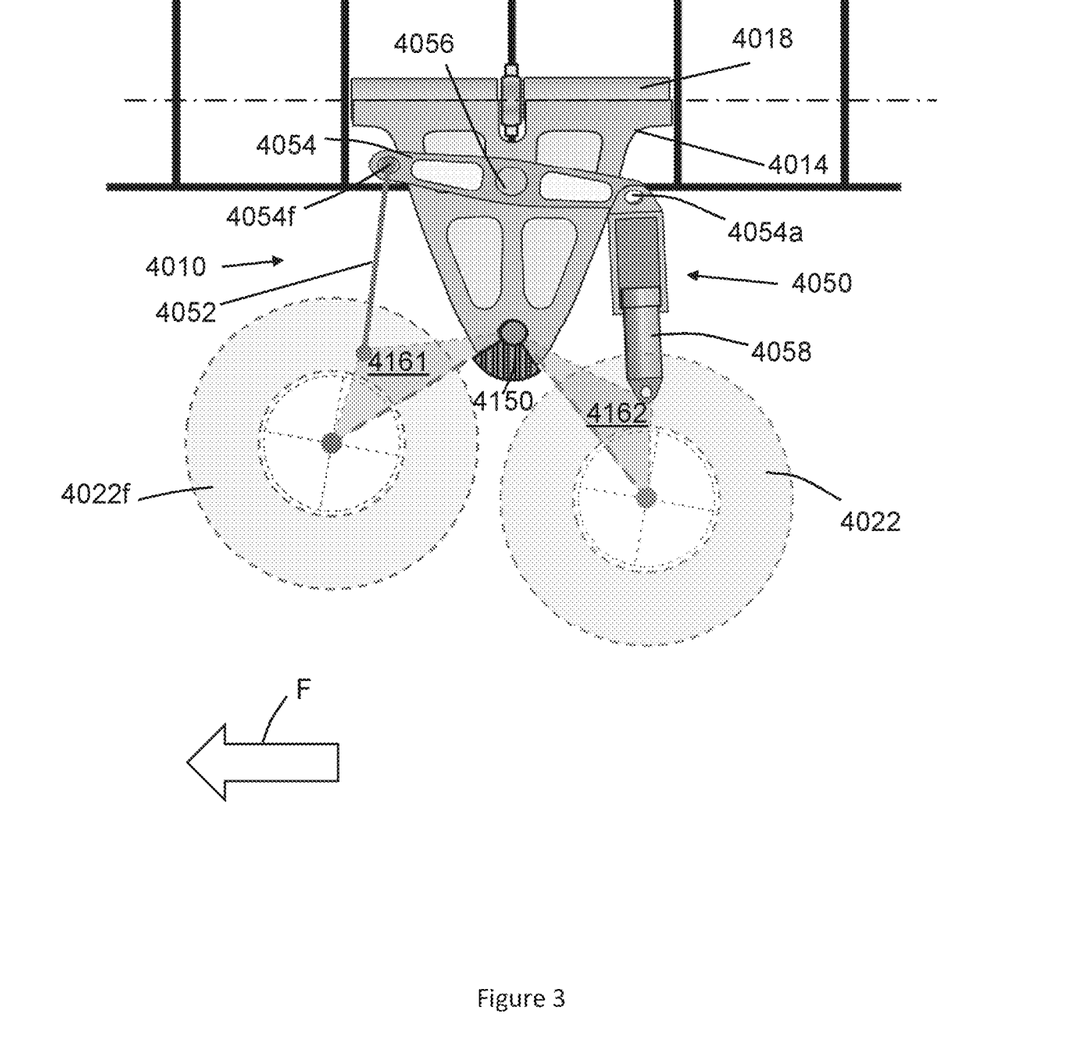
FIG. 3 is a sectional side view of an aircraft showing a modular aircraft landing gear assembly according to third embodiment of the invention, using a shock absorber and a balance arm.

FIG. 3 shows a two-wheel landing gear assembly according to a third embodiment similar to that shown in FIGS. 1 and 2 Like reference numerals are used for like parts, but adding 4000 to the numbers used in FIG. 1. The main differences between the previous embodiments will now be described. The bracket 4014 is shorter in the fore-aft direction at its upper end, in that the hinge portion is shorter. The loads transmitted into the aircraft body are therefore more concentrated (in the fore-aft direction). In a variation of this embodiment, the hinge portion is the same length and the bracket 4014 has a substantially identical shape as in FIG. 1. The bracket 4014 also uses a shock absorber and linkage system 4050 instead of one or more spring assemblies. As such the structure providing the stops that interact with the spring system as shown in FIG. 1 (which stop structure may be modular—and separately removable—in any case) is not present in the embodiment of FIG. 3. The shock absorber and linkage system 4050 comprises a link 4052 pivotally mounted to the fore lever 4161 at one end and pivotally mounted at the other end to a fore end of the balance arm 4054 at a fore pivot point 4054*f*. A principal pivot point of the balance arm 4054 is pivotally mounted at a mounting point 4056 on the bracket near the middle of the bracket as viewed in FIG. 3. A shock absorber 4058, pivotally mounted to the aft lever 4162 at one end, is pivotally mounted at the other end to the aft end of balance arm 4054 (at an aft pivot point 4054*a*).

Figure 4:
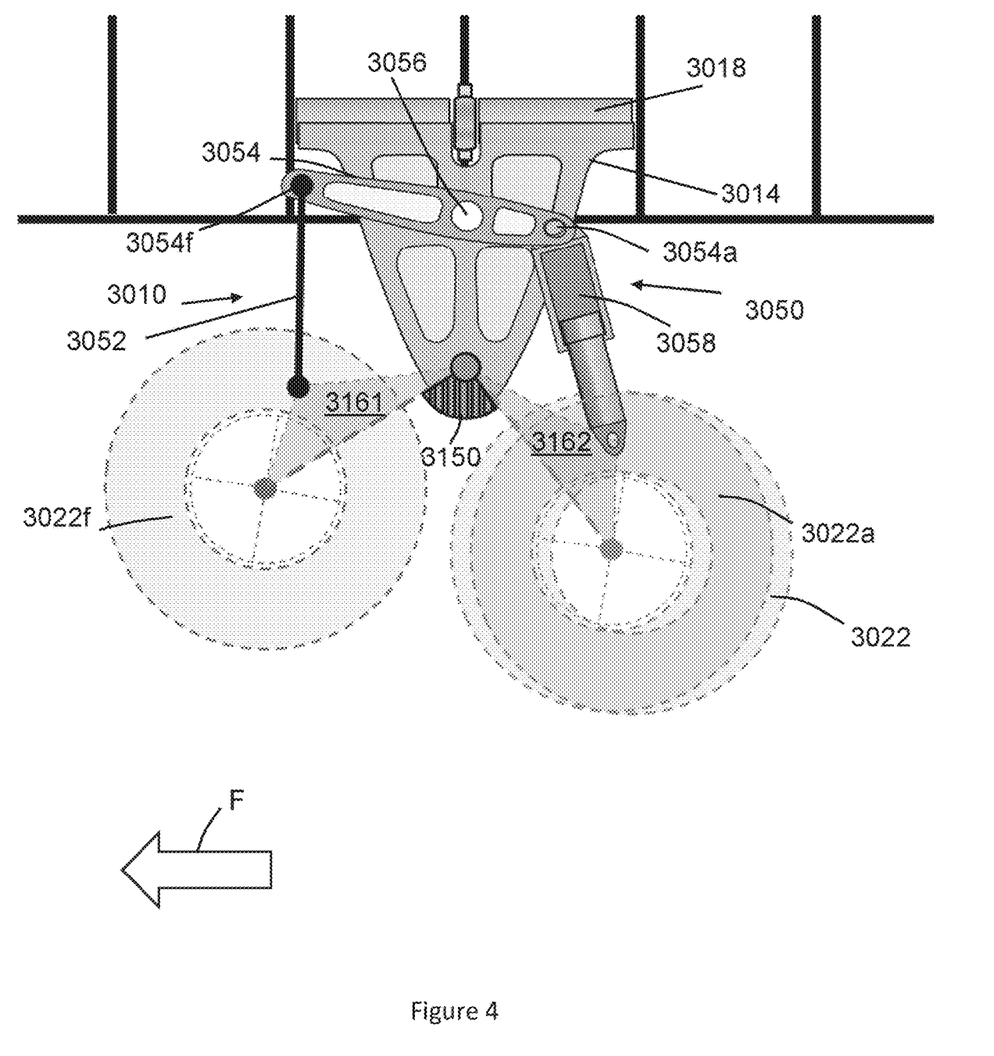
FIG. 4 is a sectional side view of an aircraft showing a modular aircraft landing gear assembly according to fourth embodiment of the invention, using a shock absorber and an offset balance arm.

FIG. 4 shows a three-wheel landing gear assembly according to a fourth embodiment of the invention, that is similar to that shown in FIG. 3. Like reference numerals are used for like parts, but adding 3000 to the numbers used in FIG. 3. The main differences between this embodiment and the previous embodiments will now be described.

The aft wheels 3022*a* behind of the fore wheel 3022*f* are in a diablo arrangement (axes lying on a common notional line), with one aft wheel 3022 being located to one side in an outboard direction of the bracket 3014 (and also in a position located to one side in an outboard direction of the lever 3016) and the other aft wheel 3022*a* being located to the other side (i.e. in an inboard direction) of the bracket 3014 (and also in a position located to one side in the inboard direction of the lever 3016).

Greater loads are expected at the aft end of the balance arm 3054 as a result of the loads transferred from the aft wheel 3022 as compared to the loads expected at the fore end of the balance arm 3054 from the loads transferred from the fore wheel 3022*f*. To better balance the moments on the balance arm it is mounted in an offset position such that the point on the balance arm corresponding to the mounting point 3056 is positioned off-centre and closer to the aft mounting point 3054*a* on the balance arm. The loads on the wheels should therefore be more evenly distributed and the loads into the aircraft may be better distributed. The mounting point 3056 is located two-thirds of the way along the balance arm 3054 so the moment arm from the mounting point 3056 to the aft end 3054*a* is half of that from the mounting point 3056 to the fore end 3054*f*.

Figure 5:
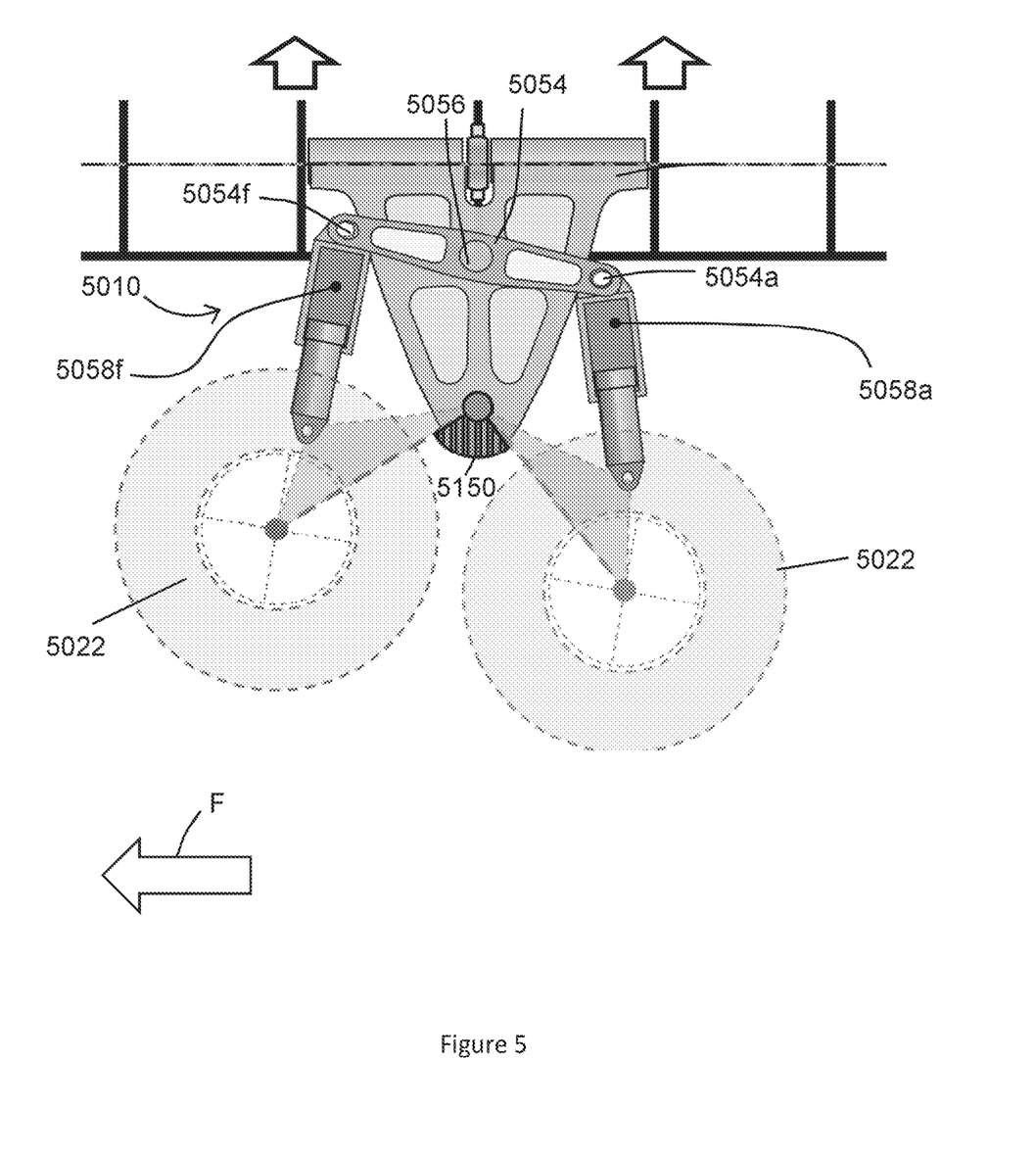
FIG. 5 is a sectional side view of an aircraft showing a modular aircraft landing gear assembly according to a fifth embodiment of the invention, using segregated high-pressure and low-pressure shock absorbers in combination.

FIG. 5 is a sectional side view of an aircraft showing a modular aircraft landing gear assembly according to fifth of the invention using segregated high-pressure and low-pressure shock absorber in combination landing gear assembly according to an embodiment similar to that shown in FIGS. 3 and 4 Like reference numerals are used for like parts, but starting with a "5" not a "3" or "4" as in FIGS. 3 and 4 (adding 5000 to the numbers used in FIG. 1). The main differences will now be described. The landing gear carries four wheels 5022 (through only two of the four are visible), with a similarly sized bracket 5014, but using an extra shock absorber. There are thus two shock absorbers: a fore shock absorber 5058*f* and an aft shock absorber 5058*a*, each pivotally mounted at opposite ends 5054a, 5054f of the balance arm 5054. In this embodiment, the balance arm is mounted at a centre point 5056 to the bracket 5014 which is located midway between the aft mounting point 5054a and the fore mounting point 5054f on the balance arm. The fore shock absorber 5058f is a high pressure shock absorber (transferring high load for a given effective surface area), whereas the aft shock absorber 5058a is a low pressure absorber. The high pressure shock absorber is pressurised to twice the pressure of the low pressure shock absorber. The linkage assembly comprising the two segregated and different shock absorbers, and the balance arm, is thus able to act as a two-stage shock absorbing system for the four wheels. In an alternative embedment, not shown, but similar to FIG. 5, the landing gear assembly has two wheels, one on the fore shock absorber 5058f, and one on the aft shock absorber 5058a. The remaining features of the alternative embodiments are substantially the same as FIG. 5.

Figure 6:
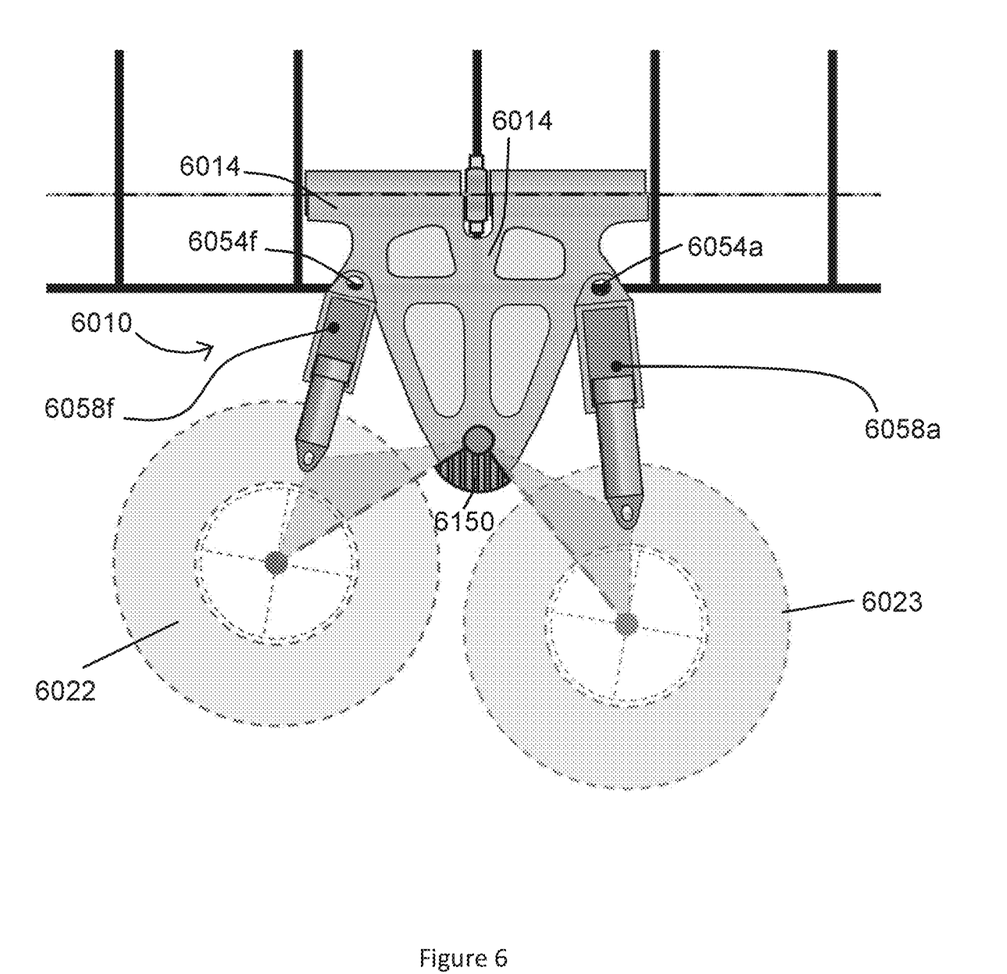
FIG. 6 is a sectional side view of a landing gear assembly according to sixth embodiment of the invention that is similar to that shown in FIG. 5, using two independent shock absorbers, a larger aft shock absorber and a smaller fore shock absorber.

FIG. 6 is a sectional side view of a landing gear assembly according to a sixth embodiment similar to that shown in FIG. 5 but with three wheels, using two independent shock absorbers, a larger aft shock absorber 6068a and a smaller fore shock absorber 6068f, both of which have the same charge pressure. Like reference numerals are used for like parts, but starting with a "6" and not a "5" as in FIG. 5 (adding 6000 to the numbers used in FIG. 1). Here, the linkage assembly (i.e. the link) comprises those two shock absorbers 6068a and 6068f, a fore shock absorber 6068f, and an aft shock absorber 6068a. Mounted at an end of the fore shock absorber is a single fore wheel 6022, and mounted at the end of the aft shock absorber are two aft wheels 6023 (although only one aft wheel is visible in the figure). At the opposite end to the fore wheel the fore shock absorber 6068f is mounted at a fore rotatable mounting point 6054f on the bracket 6014, and at an opposite end to the aft wheels 6063 the aft shock absorber 6058a is mounted at an aft rotatable mounting point 6054a of the bracket 6014. Thus, the shock absorbers are independent in the sense that movement of the fore shock absorber 6068f will not cause the aft shock absorber 6068a to move. The aft shock absorber 6058a has internal cross sectional area that is double that of the fore shock absorber 6068f. This means that the aft shock absorber 6058a will compress at half the rate than the fore shock absorber 6068f. As there are two wheels 6023 on the aft shock absorber 6068f, and a single wheel 6022 on the fore shock absorber 6068a, there are approximately equal tyre loads on each of the tyres of the wheel 6022, 6023. This means that the tyres will wear at an even rate.

In an alternative embodiment, not shown, but similar to that of FIG. 6, there are two wheels on the fore shock absorber, and two wheels on the aft shock absorber. The internal cross sectional area of both the fore shock absorber and the aft shock absorber are the same, and thus both shock absorbers compress at the same rate. This results in the tyre loads in the tyres of each of the two wheels on the fore shock absorber, and the tyres of each of the two wheels on the after shock absorber being approximately the same.

FIG. 7 shows an aircraft 13, the aircraft having the landing gear assembly 10 of the first embodiment of the invention located on an aircraft 13. The landing gear assembly 10 is mounted as a main landing gear. Alternatively, any of the other landing gear assemblies of the other embodiments could be used on the aircraft 13.

The aircraft landing gear assembly will now be described in use in relation to the first embodiment, when mounted on an aircraft. However the principles of use that will now be described apply equally to all of the aforementioned embodiments of the landing gear assembly previously described. Prior to landing, the following steps occur: i) deploying the landing gear 10 from a landing gear bay (not shown), by rotating the landing gear bracket 14 about the axis of rotational mounting 181, ii) the fore lever 161, rotationally mounted (at mounting point 20) to the bracket 14, carrying the fore landing gear wheel 22, dropping to rest against the fore stop 151, iii) the aft lever 162, rotationally mounted to the bracket 14 independently of the fore lever 161, carrying the aft landing gear wheel 23, dropping to rest against the aft stop 152, so as to extend lower than the fore wheel 22 when a longitudinal axis of the aircraft is substantially horizontal (or pivoted nose upwards).

The stop mechanism 150 enables the fore and aft landing gear levers 161, 162 to be arranged such that the rear lever 162 is angled further downwards than the fore lever 161. Hence, the fore tyres on the fore wheel 22 are set slightly higher, and the rear tyres set slightly lower than level. Thus, the rear tyres on the aft wheel 23 are closer to the ground. Thus, during landing, if the aircraft is approaching the ground in a flat configuration (i.e., with the rotational mounting axis 181 is substantially parallel to the ground, and/or substantially horizontal to the vertical), the aft wheel 23 would touch down on the ground prior to the fore wheel 22 touching down. The dropping of the fore lever 161 and the aft lever 162 occur substantially under the force of gravity, however there is also a spring (not shown) that applies a small pre-load force to the fore lever 161 and the aft lever 162 to encourage them against the fore stop 151 and the aft stop 152 respectively, such that the fore/aft levers 161, 162 do move off the fore/aft stops 151, 152 when experiencing a relatively minor force, such as those which would be caused by turbulence during a landing approach of the aircraft.

Thus, at landing, this results in a smooth transfer of load though linkage 135, and results in there being a relatively smooth landing even when the aircraft is in the flat configuration. The aft wheel 23 touching down before the fore wheel 22 results in a reduced dynamic load being exerted on the airframe of the aircraft. This is especially important as these flat landings are often performed at higher descent rates than tail down landings (and so have the potential to be more uncomfortable and to cause greater dynamic airframe loading).

The aft wheel 23 touching down before the fore wheel 22 causes the aft wheel 23 to "spin-up" due to a drag impulse load generated by the wheel contacting the ground. The aft wheel 23 spinning-up at a different time to the fore wheel 22 minimises the effects of any forces that result from the resonance of the wheels spinning up. This reduction of force felt by the airframe allows for structural weight savings to be made to the airframe.

Whilst no "weight on wheels" detection apparatus is depicted in the figures, landing with the landing gear arrangement of the aforementioned embodiments allows for a "weight on wheels" situation to be detected more easily. This enables braking, lift dumping and reverse thrust to be initiated earlier. The "weight on wheels" situation can be more easily detected because the rear (and fore) levers 161, 162 are moving off from a fixed stop mechanism 150 when they touch the ground. They do not have to move off from a relative position of a hydraulic cylinder and there is no ability to move off in a different direction (i.e. they cannot move further downwards, as they are prevented from doing so by the stop mechanism 150). Thus, the embodiments presented herein allow for a more accurate detection of "weight on wheels".

Throughout the specification, the terms low pressure shock absorber and high pressure shock absorber are relative and convey the meaning merely that the pressure of the low pressure shock absorber is lower than the pressure of high pressure shock absorber; rather than placing any absolute limits on the operating pressure of either the low pressure shock absorber or the high pressure shock absorber.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

It should be understood that whilst the embodiments described have a first angle $\alpha_1$ being 150% greater than the second angle $\alpha_2$, the first angle $\alpha_1$ may be any number of a wide range of sizes relative to the second angle $\alpha_2$, so long as this results in the stop mechanism arranged such that aft lever is angled further downwards than the fore lever. For example, in some embodiments, the first angle may be 110% greater than the second angle. In yet further, examples the first angle $\alpha_1$ may be 140% greater than the second angle, or 170% greater than the second angle.

It should be understood that whilst the embodiments described herein refer to the first angle being 60° from the notional bracket axis and the second angle being 40° from the notional bracket axis, the first angle and second angle may take any value, so long as this results in the stop mechanism arranged such that aft lever is angled further downwards than the fore lever. For example, in some embodiments the first angle is approximately 50°, and the second angle is approximately 30°. In yet further embodiments the first angle is approximately 70°, and the second angle is approximately 50°.

It should be understood that whilst the embodiments described herein refer to the notional bracket axis being substantially vertical when the landing gear is extended, the notional bracket axis may take a number of different angles when in use. In some example, in use, the notional bracket axis may be at substantially ninety degrees to the rotational mounting axis. In further example, in use, the rotational mounting axis may be substantially horizontal.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

Throughout the specification, the terms "rear" and "aft" are taken to be interchangeable.

The invention claimed is:

1. An aircraft landing gear assembly, wherein the aircraft landing gear assembly comprises:
   i) a bracket comprising:
      a hinge portion for rotationally mounting the bracket relative to a landing gear bay, the hinge portion defining an axis of rotational mounting of the bracket,
      a first mounting point, the shortest distance from the axis of rotational mounting to the first mounting point defining a notional bracket axis,
   ii) a fore lever having a first end which is rotatably mounted to the bracket at the first mounting point and a second end for receiving a fore aircraft wheel,
   iii) an aft lever having a first end which is rotatably mounted to the bracket at the first mounting point and a second end for receiving a rear aircraft wheel, the fore and aft levers being independently moveable,
   iv) a fore linkage assembly, comprising at least one of a spring and a shock absorber, for transmitting ground loads from the fore lever to the bracket at a second mounting point, fore of the first mounting point,
   v) a rear linkage assembly, comprising at least one of a spring and a shock absorber, for transmitting ground loads from the rear lever to the bracket at a third mounting point, aft of the first mounting point, wherein the bracket further comprises:
      a) a fore lever stop to prevent downwards movement of the fore lever past a lowest rotational position with respect to the bracket, wherein the lowest rotational position of the fore lever is at a first angle forward from the notional bracket axis,
      b) a rear lever stop to prevent downwards movement of the rear lever past a lowest rotational position with respect to the bracket, wherein the lowest rotational position of the rear lever is at a second angle behind from the notional bracket axis, wherein the first angle is greater than the second angle.

2. The aircraft landing gear assembly as claimed in claim 1, wherein the fore lever stop is provided by a surface, having a surface angle, the surface angle corresponding to the first angle.

3. The aircraft landing gear assembly as claimed in claim 2, wherein the fore lever stop surface is fixed in relation to the bracket.

4. The aircraft landing gear assembly as claimed in claim 1, wherein the rear lever stop is provided by a surface, having a surface angle, the surface angle corresponding to the second angle.

5. The aircraft landing gear assembly as claimed in claim 4, wherein the rear lever stop surface is fixed in relation to the bracket.

6. The aircraft landing gear assembly as claimed in claim 1, wherein the fore lever stop and the rear lever stop are both provided by a single lever stop assembly attached to the bracket.

7. The aircraft landing gear assembly as claimed in claim 6, wherein the single lever stop assembly is in the shape of a sector of a circle.

8. The aircraft landing gear assembly as claimed in claim 1, wherein the fore linkage assembly and rear linkage assembly are independent of each other, such that movement of one linkage assembly does not affect the other linkage assembly.

9. The aircraft landing gear assembly as claimed in claim 1, wherein the fore linkage assembly and rear linkage assembly are linked so that the load sharing between the fore and aft wheels is balanced.

10. The aircraft landing gear assembly as claimed in claim 1, wherein the first angle is between 110% and 200% greater than the second angle.

11. The aircraft landing gear assembly as claimed in claim 1, wherein it is a main landing gear assembly.

12. The aircraft landing gear assembly as claimed in claim 1, wherein the first angle is between 130% and 170% greater than the second angle.

13. The aircraft landing gear assembly as claimed in claim 1, wherein the first angle is between 140% and 160% greater than the second angle.

14. An aircraft, comprising:
  the aircraft landing gear assembly of claim 1, wherein the bracket is rotationally mounted relative to a landing gear bay about the axis of rotational mounting.

15. The aircraft as claimed in claim 14, wherein the axis of rotational mounting is parallel to a longitudinal axis of the aircraft.

\* \* \* \* \*